(12) United States Patent
Raghavan et al.

(10) Patent No.: US 12,108,377 B2
(45) Date of Patent: Oct. 1, 2024

(54) ENHANCEMENT TO BANDWIDTH PART (BWP) SWITCHING FOR SECONDARY CELL (SCELL)

(71) Applicant: Apple Inc., Cupertino, CA (US)

(72) Inventors: Manasa Raghavan, Sunnyvale, CA (US); Jie Cui, San Jose, CA (US); Yang Tang, San Jose, CA (US); Huaning Niu, San Jose, CA (US); Fangli Xu, Beijing (CN); Dawei Zhang, Saratoga, CA (US); Hong He, San Jose, CA (US); Oghenekome Oteri, San Diego, CA (US); Chunxuan Ye, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/442,531

(22) PCT Filed: Oct. 23, 2020

(86) PCT No.: PCT/CN2020/123246
§ 371 (c)(1),
(2) Date: Sep. 23, 2021

(87) PCT Pub. No.: WO2022/082729
PCT Pub. Date: Apr. 28, 2022

(65) Prior Publication Data
US 2023/0247615 A1 Aug. 3, 2023

(51) Int. Cl.
*H04W 72/0457* (2023.01)
*H04L 5/00* (2006.01)

(52) U.S. Cl.
CPC ....... *H04W 72/0457* (2023.01); *H04L 5/0053* (2013.01); *H04L 5/0094* (2013.01); *H04L 5/0096* (2013.01)

(58) Field of Classification Search
None
See application file for complete search history.

(56) References Cited

U.S. PATENT DOCUMENTS

| 10,959,271 B2 | 3/2021 | Yi et al. |
| 2019/0141695 A1 | 5/2019 | Babaei et al. |

(Continued)

FOREIGN PATENT DOCUMENTS

| CN | 110677887 A | 1/2020 |
| CN | 111279783 A | 6/2020 |

(Continued)

OTHER PUBLICATIONS

International Search Report and Written Opinion of the International Searching Authority directed to related International Patent Application No. PCT/CN2020/123246, mailed Jul. 29, 2021; 9 pages.

(Continued)

*Primary Examiner* — Brian S Roberts
(74) *Attorney, Agent, or Firm* — Sterne, Kessler, Goldstein & Fox P.L.L.C.

(57) ABSTRACT

Systems, methods and devices can are provided, which can include configuring one or more bandwidth parts for a secondary cell (SCell) that is in communication with a user equipment (UE). A base station transmits to a UE a first radio resource control (RRC) message including one or more configuration parameters for a first bandwidth part (BWP) associated with a secondary cell (SCell). The UE communicates a first message with the SCell via the first SCell BWP. The UE receives a second RRC message indicating a change from the first SCell BWP to a second SCell BWP to be used for SCell communications. The UE communicates a second message with the SCell via the second SCell BWP.

20 Claims, 8 Drawing Sheets

(56) References Cited

U.S. PATENT DOCUMENTS

| | | | |
|---|---|---|---|
| 2019/0149213 A1 | 5/2019 | Zhou et al. | |
| 2019/0149421 A1* | 5/2019 | Jin | H04L 5/0078 |
| | | | 370/331 |
| 2019/0200392 A1* | 6/2019 | Agiwal | H04L 5/001 |
| 2019/0253230 A1* | 8/2019 | Loehr | H04W 72/0453 |
| 2019/0357215 A1* | 11/2019 | Zhou | H04L 5/0053 |
| 2020/0244410 A1* | 7/2020 | Kim | H04W 72/542 |
| 2021/0051640 A1* | 2/2021 | Pao | H04W 72/0453 |
| 2021/0176029 A1* | 6/2021 | Tsai | H04B 7/0626 |

FOREIGN PATENT DOCUMENTS

| | | |
|---|---|---|
| WO | WO 2020/159227 A1 | 8/2020 |
| WO | WO 2020192540 A1 | 10/2020 |

OTHER PUBLICATIONS

Huawei et al., "Impacts of RRC based BWP activation," R2-1805775, 3GPP TSG-RAN WG2 Meeting 101bis, Sanya, China, Apr. 20, 2018; 3 pages.

Huawei et al., "RRC triggered BWP activation and initial BWP configuration," R2-1807461, 3GPP TSG-RAN2 Meeting #102, Busan, South Korea, May 25, 2018; 9 pages.

Nokia et al., "RRM TC 20B EN-DC interruptions due to active BWP switching (RRC-based switch)," R4-1813212, 3GPP TSG-RAN WG4 Meeting #88bis, Chengdu, China, Oct. 12, 2018; 10 pages.

Office Action and Search Report directed to related Chinese Application No. 202080106518.7, with machine translation attached, mailed Aug. 1, 2024; 16 pages.

* cited by examiner

ENHANCEMENT TO BANDWIDTH PART (BWP) SWITCHING FOR SECONDARY CELL (SCELL)

CROSS REFERENCE TO RELATED APPLICATIONS

The present application is a United States National Phase of International Application No. PCT/CN2020/123246, filed on Oct. 23, 2020, which is incorporated herein by reference in its entirety.

FIELD

The described aspects generally relate bandwidth part (BWP) activation and de-activation in New Radio (NR).

BACKGROUND

A Bandwidth Part (BWP) refers to a subset or part of total allocated carrier bandwidth, forming a set of contiguous common resource blocks (CRBs) within the full carrier bandwidth.

BRIEF SUMMARY

The disclosure relates to a communication network, specifically BWP switching involving a secondary cell (SCell) of a communication network. A BWP can start at a specified CRB and span a set of consecutive CRBs. According to some embodiments, methods, systems and devices can configure one or more bandwidth parts for a secondary cell (SCell). In some embodiments, a user equipment (UE) can receive a first radio resource control (RRC) message comprising one or more configuration parameters for a first bandwidth part (BWP) associated with a secondary cell (SCell). The UE can communicate a first message with the SCell via the first SCell BWP. The UE can receive a second RRC message indicating a change from the first SCell BWP to a second SCell BWP to be used for SCell communications. The UE can communicate a second message with the SCell via the second SCell BWP.

In some embodiments, a UE includes a transceiver configured to perform wireless communications over a wireless network and one or more processors, coupled to the transceiver. The one or more processors can be configured to receive a first RRC message including one or more configuration parameters for a first BWP associated with a SCell, and communicate, using the transceiver, a first message with the SCell via the first SCell BWP. The one or more processors can further be configured to receive a second RRC message indicating a change from the first SCell BWP to a second SCell BWP to be used for SCell communications, and communicate, using the transceiver, a second message with the SCell via the second SCell BWP.

In some embodiments, a non-transitory tangible computer-readable medium has instructions stored thereon, that when executed by a processor of a UE, cause the UE to perform operations. The operations can include: receiving a first RRC message comprising one or more configuration parameters for a first BWP associated with a secondary cell (SCell), processing the first RRC message including configuring the UE to communicate with the SCell using the first SCell BWP, communicating a first message with the SCell via the first SCell BWP, receiving a second RRC message indicating a change from the first SCell BWP to a second SCell BWP to be used for SCell communications, processing the second RRC message including reconfiguring the UE to communicate with the SCell using the second SCell BWP, and communicating a second message with the SCell via the second SCell BWP.

In some embodiments, the UE processes the first RRC message including configuring the UE to communicate with the SCell using the first SCell BWP, and the UE processes the second RRC message including reconfiguring the UE to communicate with the SCell using the second SCell BWP. In some embodiments, after the reconfiguring, the UE can receive an SCell deactivation message via MAC CE and process the deactivation message by deactivating all BWPs associated with the SCell. In some embodiments, the first message and the second message each comprise at least one of the following: an uplink shared channel, a downlink shared channel, a control channel, a channel state information report, or a sounding reference signal. In some embodiments, the UE does not deactivate the SCell after processing the first RRC message and before processing the second RRC message.

In some embodiments, the UE communicates with a primary cell (PCell), where the SCell provides secondary radio resources supplementing primary radio resources provided by the PCell, and where the UE receives the first RRC message from the PCell. In some embodiments, the UE can receive a third RRC message comprising one or more configuration parameters of a first PCell BWP, and process the third RRC message including configuring the UE to communicate with the PCell using the first PCell BWP. The UE can receive a fourth RRC message indicating a change of the first PCell BWP to a second PCell BWP, and processes the fourth RRC message including reconfiguring the UE to communicate with the PCell using the second PCell BWP.

According to some embodiments, enabling a UE to reconfigure one or more BWPs is performed without requiring the SCell to be deactivated. For example, the UE can activate a previously non-active BWP and deactivate a previously active BWP for the SCell. Thereby, in a communication network, a UE is enabled to receive updates and reconfiguration messages to change an active BWP applicable to SCell while minimizing signaling and processing delays that would occur if the SCell had to be deactivated.

BRIEF DESCRIPTION OF THE DRAWINGS/FIGURES

DETAILED DESCRIPTION

Some aspects of this disclosure include apparatuses and methods for BWP switching including reconfiguring SCell communication for 3rd Generation Partnership Project (3GPP) releases, such as release 16 (Rel-16), release 17 (Rel-17), and other present/future 3GPP standards.

Figure 1:
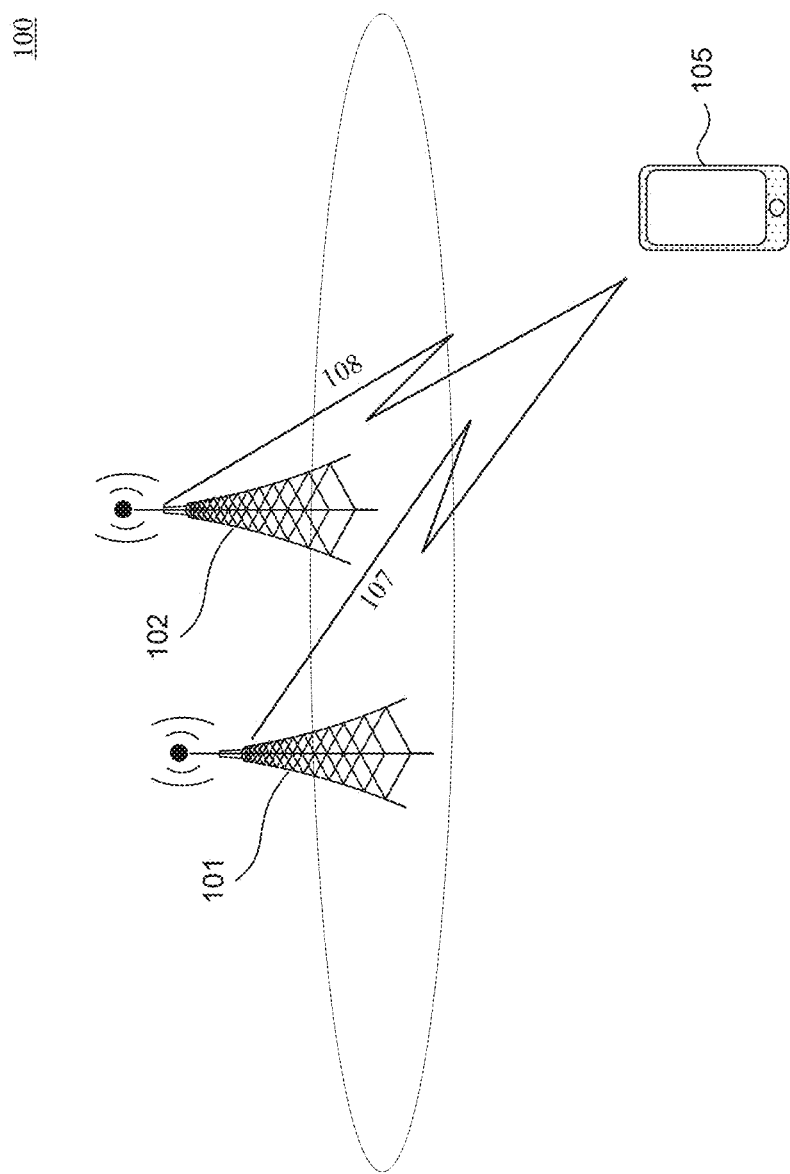
FIG. 1 illustrates an example system implementing designs for implementing downlink (DL) and uplink (UL) BWP switching for SCell, according to some aspects of the disclosure.

FIG. 1 illustrates an example system 100 implementing designs for implementing downlink (DL) and uplink (UL) BWP switching for an SCell, according to some aspects of the disclosure. Example system 100 is provided for the purpose of illustration only and does not limit the disclosed aspects. System 100 may include, but is not limited to, a network node (for example, a base station such as eNB, gNB, etc.) 101, a network node 102 and electronic device (for example, a UE) 105. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. For example, UE 105 can include an electronic device configured to operate using a 3GPP release, such as Release 17 (Rel-17), or other present or future 3GPP standards. UE 105 can include, but is not limited to, wireless communication devices, smart phones, laptops, desktops, tablets, personal assistants, monitors, televisions, wearable devices, Internet of Things (IoTs), vehicle's communication devices, and the like. Network node 101 can be a PCell base station 101 and network node 102 can be a SCell base station 102, both of which can be configured to operate based on a wide variety of wireless communication techniques such as, but not limited to, techniques based on 3GPP standards. For example, PCell base station 101 and/or SCell base station 102 can include nodes configured to operate using a 3GPP release, such as Rel-17, or other present or future 3GPP standards. UE 105 can be connected to and can be communicating with PCell base station 101 and SCell base station 102 using one or more communication links 107 and 108.

Some aspects of this disclosure are directed to new numerology or numerologies (e.g., u value in 3GPP Technical Specification (TS) 38.211) for operation in the frequency range above 52.6 GHz (e.g., one or more frequencies in the frequency range of between about 52.6 GHz and about 71 GHz). Some aspects of this disclosure are directed to addressing impact(s) on physical signals/channels in the frequency range above 52.6 GHz. For example, some aspects of this disclosure discuss time line related aspects adapted to each of the new numerologies, for example, bandwidth part (BWP) and beam switching times, Hybrid Automatic Repeat Request (Hybrid ARQ or HARQ) scheduling, UE processing, preparation and computation times for Physical Downlink Shared Channel (PDSCH), Physical Uplink Shared Channel (PUSCH)/Sounding Reference Signal (SRS) and Channel State Information (CSI), and the like. Some aspects of this disclosure are directed to switching BWPs utilized by a user equipment (UE). In New Radio (NR), a cell's total bandwidth can be divided into BWPs utilized by the UE, such as a wireless device, to reduce UE power consumption for UEs capable of receiving maximum carrier bandwidth, or permit implementation of a subset of a full bandwidth by other UEs, where scanning the full NR bandwidth would consume excess power.

A BWP can be activated to define a UE's operating bandwidth within the cell's operating bandwidth, while other BWP's can be configured but deactivated. Only one BWP in downlink (DL) and one BWP in uplink (UL) can be activated at a time. To reconfigure an active BWP for a secondary cell (SCell) in conventional NR, the SCell is first deactivated. Subsequently, the SCell is activated on a new BWP, and a latency/delay of reconfiguring the active BWP includes the overhead of such deactivation/activation signalling and processing. Some aspects of this disclosure are directed to BWP switching for SCell enhancements/optimization for PDSCH/PUSCH, such as, but not limited to, supporting UL scheduling if frequency domain resource allocation with different granularity than FR1/2 (e.g., sub-Physical Resource Block (PRB), or more than one PRB) is supported. Some aspects of this disclosure are directed to time domain scheduling enhancements for PDSCH/PUSCH, such as, but not limited to, increasing a minimum time-domain scheduling unit to be larger than one symbol, supporting multi-PDSCH scheduled by one Downlink Control Information (DCI), supporting one Transport Block (TB) mapped to multiple slots (i.e., Transmit Time Interval (TTI) bundling), and the like. Some aspects of this disclosure are directed to enhancements and/or alternatives to the BWP switching mechanism to reduce BWP switching latency due to SCell deactivation reactivation overhead.

Figure 2:
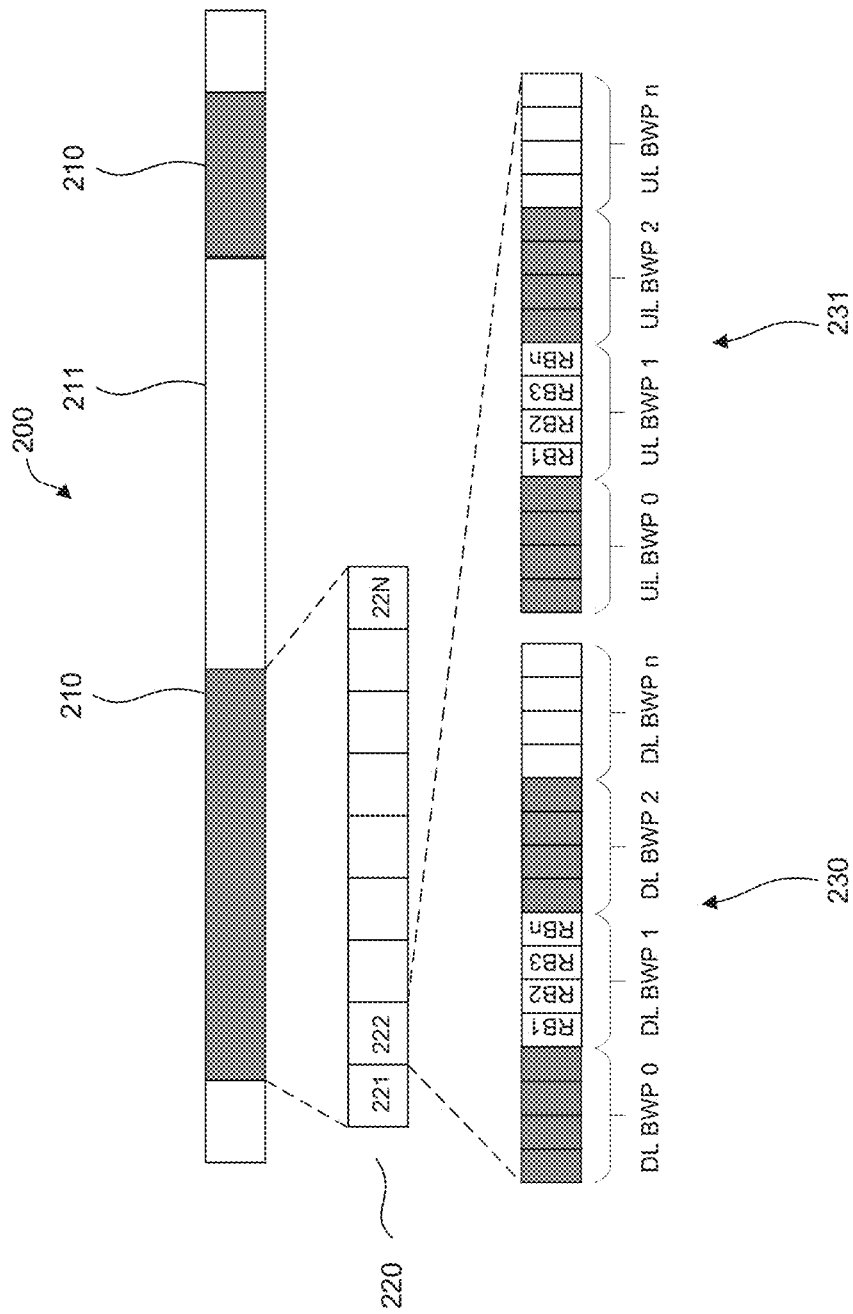
FIG. 2 illustrates a spectrum and set of BWPs for implementing downlink (DL) and uplink (UL) messaging including BWP switching for SCell, according to some aspects of the disclosure.

As illustrated in FIG. 2, spectrum 200 is partitioned for uses including cell frequency bands 210 and non-cell frequency bands 211. At least a portion of cell frequency bands 210 can be allocated for use by a user equipment (UE) of a communication network. Cell frequency bands 210 can be subdivided into multiple cell bandwidths 220 (e.g., cell operating bandwidths 221, 222, up to 22N). A cell operating bandwidth can utilized by a UE (e.g., UE 105) for communication between UE 105 and the example system 100 (e.g., PCell base station 101 and/or SCell base station 102).

UE 105 can be configured to utilize a subset of the cell operating bandwidth. For example, a UE can be configured to utilize operating bandwidth 222 as shown in FIG. 2. To minimize power consumption, UE 105 can be further configured with a number of downlink BWPs (e.g., one to four DL BWPs 230 indexed as DL BWPs 0 to n), and a number of uplink BWPs (e.g., one to four UL BWPs 231 indexed as UL BWPs 0 to n), for each serving cell. In some embodiments, the cell can be configured with up to four additional uplink BWPs on a supplementary uplink (SUL) carrier (not shown). As noted above, dividing an operating bandwidth into BWPs can minimize and/or reduce power consumption. For example, in embodiments, to minimize UE power consumption, a single DL BWP and a single UL BWP are active at a given time on an active serving cell.

The active BWP defines the UE's operating bandwidth (e.g., for DL and UL) within the cell's operating bandwidth. All other configured BWPs can be deactivated such that the UE does not transmit or receive any data on the deactivated BWPs. In some embodiments, UE 105 can receive Physical Downlink Shared Channel (PDSCH), Physical Downlink Control Channel (PDCCH), or channel state information reference signal (CSI-RS) inside an active DL BWP. UE 105 can additionally perform radio resource management (RRM) measurements outside the active DL BWP (e.g., via measurement gaps). In some embodiments, UE 105 can transmit Physical Uplink Shared Channel (PUSCH), and/or Physical Uplink Control Channel (PUCCH) inside an active UL BWP. In some embodiments, for an active serving cell, UE 105 does not transmit sounding reference signal (SRS) outside an active UL BWP.

In some embodiments, a BWP-pair includes an active UL BWP and an active DL BWP having the same center frequency. The network can dynamically switch the UE to the desired BWP as needed. A BWP is formed by a set of contiguous Resource Blocks (e.g., RB1 to RBn for DL BWP 1 and RB1 to RBn for UL BWP 1). In some embodiments, UE 105 is configured to schedule communications only within an active BWP, such as DL BWP 1 and/or UL BWP 1. UE 105, does not schedule communication on a deactivated BWP.

In some examples, a BWP indicator can be used to identify specific BWPs for resource allocation (which can be used for BWP switching). According to some aspects, Resource Allocation Type specifies the way in which a scheduler allocates resource blocks for each transmission. For example, DL/UL Resource Allocation Type 0 can indicate a set of allocated Resource Block Groups (RBG). In some examples, the RBG can be a set of contiguous Virtual Resource Blocks (VRBs). In some examples, in Resource Allocation Type 1, the resource is allocated to one or more contiguous RBs. UE 105 may be configured by higher layers for the serving cell for a set of BWPs for receptions by UE 105 (e.g., DL BWP set) in a DL bandwidth by a parameter (e.g., DL-BWP). UE 105 can be configured with a set of (e.g., four) BWPs for transmissions by UE 105 (e.g., UL BWP set) in an UL bandwidth by a parameter (e.g., UL-BWP) for the serving cell.

A network (e.g., PCell Base Station 101) can provide UE 105 (e.g., by a higher layer) a parameter for a first active UL BWP for transmissions on an SCell, for example, if UE 105 has a dedicated BWP configuration. For example, PCell Base Station 101 can provide UE 105 with a parameter, such as Active-BWP-UL-Scell, firstActiveDownlinkBWP-Id, etc., to indicate a first active UL BWP for SCell transmissions. The higher layer parameter (e.g., firstActiveDownlinkBWP-Id) may indicate a first active DL BWP for receptions. UE 105 may be provided by a second higher layer parameter (e.g., firstActiveUplinkBWP-Id), which may indicate a first active UL BWP for transmissions on the primary cell.

RRC-Based BWP switching, i.e., by RRC reconfiguration, is possible for UL or DL. A single BWP identification (ID) is configured to be active. For example, a UE can receive from a base station, an indicator having a field firstActiveDownlinkBWP-Id or firstActiveUplinkBWP-Id to identify a first active BWP for DL and UL, respectively. Also, the configured BWP ID can be reconfigured in the dowlinkBWP-ToAddModList or uplinkBWP-ToAddModList.

More specifically for SCell, Technical Specification (TS) 38.331 section 6.3.2 defines firstActiveDownlinkBWP-Id: If configured for an SCell, this field contains the ID of the downlink bandwidth part to be used upon activation of an SCell. The initial bandwidth part is referred to by BWP-Id=0. Likewise, firstActiveUplinkBWP-Id is defined as containing the ID of the uplink bandwidth part to be used upon activation of an SCell. The initial bandwidth part is referred to by BandwidthPartId=0. In other words, for SCell, the firstActiveDownlinkBWP-Id or firstActiveUplinkBWP-Id are only used upon SCell activation. For RRC based switch for Scell, the firstActiveDownlinkBWP-Id or firstActiveUplinkBWP-Id cannot be changed by RRC reconfiguration unless there SCell deactivation and reactivation is performed.

BWPs can be configured for a Special Cell (SpCell) or a secondary cell (SCell). An SpCell can refer, in a master cell group (MCG), to the primary cell (PCell) with which the UE establishes/reestablishes connection. An SpCell may also refer, in a secondary cell group (SCG), to the primary SCG cell (PSCell) with which the UE performs random access for RRC reconfiguration. An SCell provides secondary radio resources supplementing the primary resources provided by the SpCell, such as the PCell or PSCell. Embodiments described herein disclose systems, methods, and devices for reconfiguring SCell BWPs (i.e., an active or first active BWP) utilizing the firstActiveDownlinkBWP-Id or firstActiveUplinkBWP-Id field(s) without deactivation and reactivation of SCell.

Activating an inactive BWP and deactivating an active BWP is performed by BWP switching. According to some embodiments, for SCell, when multiple BWP IDs are configured, BWP switching can be performed by changing the firstActiveDownlinkBWP-Id or firstActiveUplinkBWP-Id one of the configured BWP-Ids. As noted above, it is not possible to activate more than one BWP at a time.

However, TS 38.331 describes that unlike for PCell and PSCell, configuring firstActiveDownlinkBWP-Id and firstActiveUplinkBWP-Id indicates the ID of the DL/UP BWP to be used upon activation of an SCell. An initial DL BWP and an initial UL BWP are used at least for initial access before radio resource control (RRC) connection is established. In some embodiments, an initial BWP has an index zero and is referred to as BWP 0 (e.g., DL BWP 0 and UL BWP 0). During initialization, the UE performs cell search based on synchronization signal block (SSB) signals composed of at least one primary synchronization signal (PSS), secondary synchronization signal (SSS), and physical broadcast channel (PBCH). To access the system, the UE needs to further read system information block 1 (SIB1) to attain an initial DL/UL BWP configuration. The SIB1 is transmitted in PDSCH, which is scheduled by downlink control information (DCI) on the PDCCH using the control resource set with index zero (CORESET #0).

Before the UE reads the SIB1, the UE's initial DL BWP has the same frequency range and numerology as those of CORESET #0. Then, the UE acquires the initial DL/UL BWP configuration in the SIB1 to carry out random-access procedure to request the setup of RRC connection. The first active DL and UL BWPs may be configured for a Special Cell (SpCell) or a secondary cell (SCell). The first active DL and UL BWPs are the active DL and UL BWPs upon RRC reconfiguration for an SpCell. A base station may configure the UE with a BWP inactivity timer for the SpCell. The expiration of this timer may, for example, indicate that the UE has no scheduled transmission and reception for a while on the currently active BWP. Thus, the UE can switch its active BWP to a default BWP to save power. The default DL BWP can be configured. If not configured, the UE uses the initial DL BWP as the default DL BWP.

Figure 3:
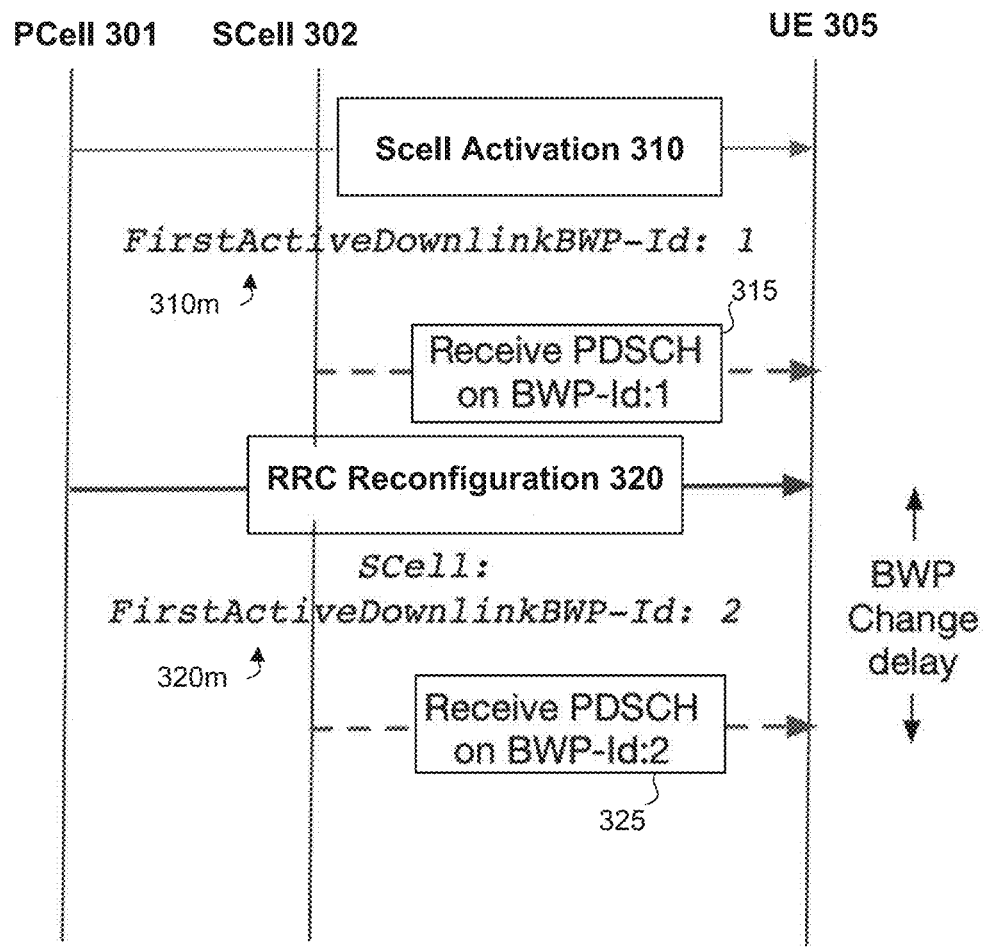
FIG. 3 illustrates a signaling diagram of an exemplary operation of BWP switching, according to some aspects of the disclosure.

FIG. 3 is a signaling diagram for exemplary procedure of BWP switching of an SCell, according to embodiments of the disclosure. As noted above, an SCell provides secondary radio resources supplementing the primary resources provided by the SpCell, such as a PCell or PSCell. Conventionally, the first active DL and UL BWPs are the active DL and UL BWPs only upon activation of an SCell. As described in greater detail below, with reference to FIGS. 4A and 4B, this configuration can cause latency and poor network performance. Specifically, by requiring a deactivation of an SCell and reactivation of the SCell before setting first active DL and UL BWPs, and additional signaling and processing overhead is necessary BWP switching in an SCell.

To avoid the added signaling and processing overhead of deactivation and activation of the SCell, FIG. 3 illustrates an exemplary embodiment in which a UE is configured to activate a BWP based on SCell activation and performs BWP switching without requiring the SCell to be deactivated and reactivated. An advantage is achieved in avoiding SCell deactivation and reactivation in order to change the firstActiveDownlinkBWP-Id and firstActiveUplinkBWP-ID. Some embodiments described herein can reduce the overall time required to switch BWPs. In the examples shown, the proposed method can have a shorter switching delay than those of FIGS. 4A and 4B.

Referring to FIG. 3, a UE, such as a wireless device, may be configured for operation in BWPs of a PCell and an SCell. The BWP configuration and BWP switching may be on an SCell. For activation of an SCell, PCell base station 301 may send (e.g., transmit) one or more messages (e.g., one or more RRC messages) including an SCell activation message (for example, by RRC) to UE 305 for configuring a BWP of an SCell, in signal 310. In some embodiments, DL BWPs and UL BWPs can be switched separately. In other embodiments, the paired DL BWP and UL BWP are switched together.

For example, SCell activation message can include an indicator of firstActiveDownlinkBWP-ID, specifying an identifier of a first active Downlink BWP. In this example, PCell base station 301 instructs UE to set firstActiveDownlinkBWP-ID equal to 1. Although not shown, in addition or alternatively, for example, SCell activation message can include an indicator of firstActiveUpinkBWP-ID, specifying an identifier of message can configure multiple BWPs (e.g., multiple BWPs comprising a DL BWP 0, a DL BWP 1, a DL BWP 2, a DL BWP 3, an UL BWP 0, an UL BWP 1, an UL BWP 2, and an UL BWP 3. The DL (and/or UL) BWP 0 may be a default BWP. The DL (and/or UL) BWP 1 may be an initial active BWP (e.g., an initial DL BWP or an initial UL BWP). UE 305 may determine the multiple BWPs configured for the SCell, for example, based on the one or more messages 310*m*.

Upon receiving the SCell activation message 310, UE 305 is capable of receiving PDSCH communications from the SCell base station 302, in signal 315. In this case, UE 305 receives a PDSCH message from SCell base station 302 on a first BWP, i.e., the BWP enumerated with DL BWP 1.

The PCell base station 301 or SCell base station 302 may send a DL assignment. The DL assignment may be sent via the DL BWP 1 (e.g., an initial DL BWP). UE 305 may receive a packet via the DL BWP 1 (or other active DL BWP), for example, based on the DL assignment. UE 305 may start a BWP inactivity timer, for example, after receiving scheduled downlink packets.

Although not shown, additionally or alternatively, PCell base station 301 or SCell base station 302 may send an UL grant, via the UL BWP 1 (e.g., a first UL BWP or an initial DL BWP). UE 305 may send a packet via an UL BWP 1 (e.g., via a first UL BWP or an initial UL BWP) based on the UL grant. UE 305 may start a BWP inactivity timer, for example, after sending scheduled uplink packets.

If it is determined to perform BWP switching for the SCell, the PCell base station 301 transmits an SCell reconfiguration message by RRC to UE 305 for reconfiguring the SCell BWP. For example, The PCell base station 301 may send an RRC Reconfiguration Message for BWP switching (e.g., a BWP switching from the DL BWP 1 to the DL BWP 2), at operation 320. For example, the RRC Reconfiguration Message can be included in a DCI Message. The SCell reconfiguration message may be sent via the active DL BWP 1. The SCell reconfiguration message can include the indicator firstActiveDownlinkBWP-ID, instructing UE to set firstActiveDownlinkBWP-ID for SCell equal to 2. To perform SCell BWP switching, UE 305 may switch the DL BWP 1 to the DL BWP 2, for example, based on the RRC Reconfiguration Message. UE 305 may receive the RRC Reconfiguration Message, for example, by monitoring a PDCCH on the active DL BWP 1. UE 305 may switch the DL BWP 1 to the DL BWP 2, for example, based on the RRC Reconfiguration Message 320*m*.

There may be a delay between the wireless device receiving the RRC Reconfiguration Message 320*m* and the wireless device switching to the DL BWP 2. UE 305 may start and/or re-start the BWP inactivity timer, for example, after the BWP switching. The PCell base station 301 or SCell base station 302 may again send a DL assignment. The DL assignment may be sent via the DL BWP 2 (e.g., a second DL BWP or other BWP activated by the BWP switching). UE 305 may receive a packet via the DL BWP 2 (or other active DL BWP), for example, based on the DL assignment.

The BWP inactivity timer may expire, for example, if the wireless device does not perform reception or transmission for a period of time. UE 305 may switch the DL BWP 2 to the DL BWP 0 (e.g., a default BWP). The fallback to the DL BWP 0 may occur, for example, after the BWP inactivity timer expires. There may be a delay between the BWP inactivity timer expiration and the wireless device switching to the DL BWP 0. In some embodiments, the PCell Base Station 301 may transmit an SCell deactivation message to UE 305. For example, a base station, such as PCell Base Station 301, can transmit one or more signals to UE 305 that includes the deactivation message. In some embodiments, the deactivation message can be transmitted in a Medium Access Control (MAC) Control Element (CE). For example, PCell Base Station 301 can send a deactivation message via MAC CE that triggers UE 305 to deactivate all BWPs, or alternatively, to use a default BWP (e.g., DL BWP 0 and/or UL BWP 0).

Figure 4A:
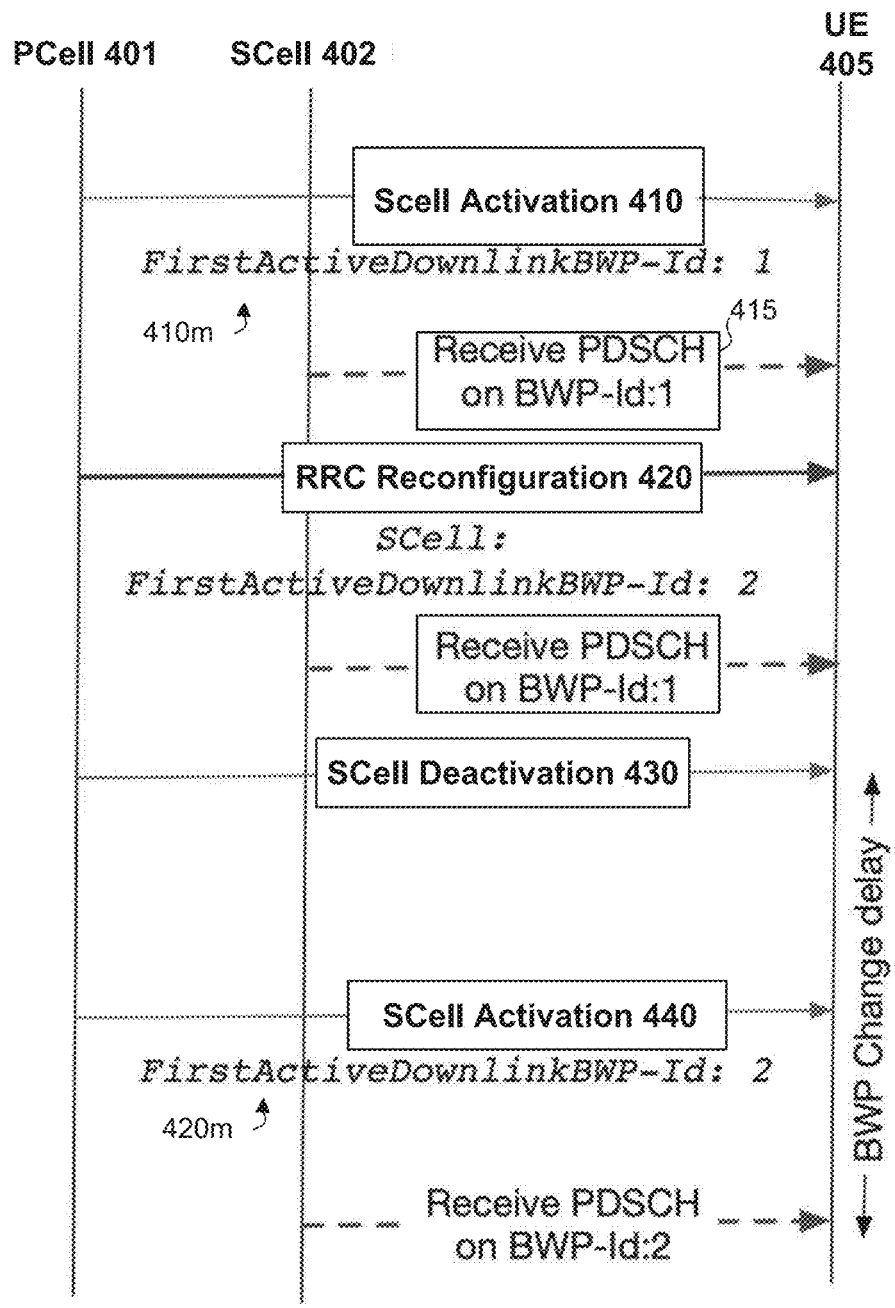
FIGS. 4A and 4B illustrate signaling diagrams of alternate operations of BWP switching, according to aspects described herein.
Figure 4B:
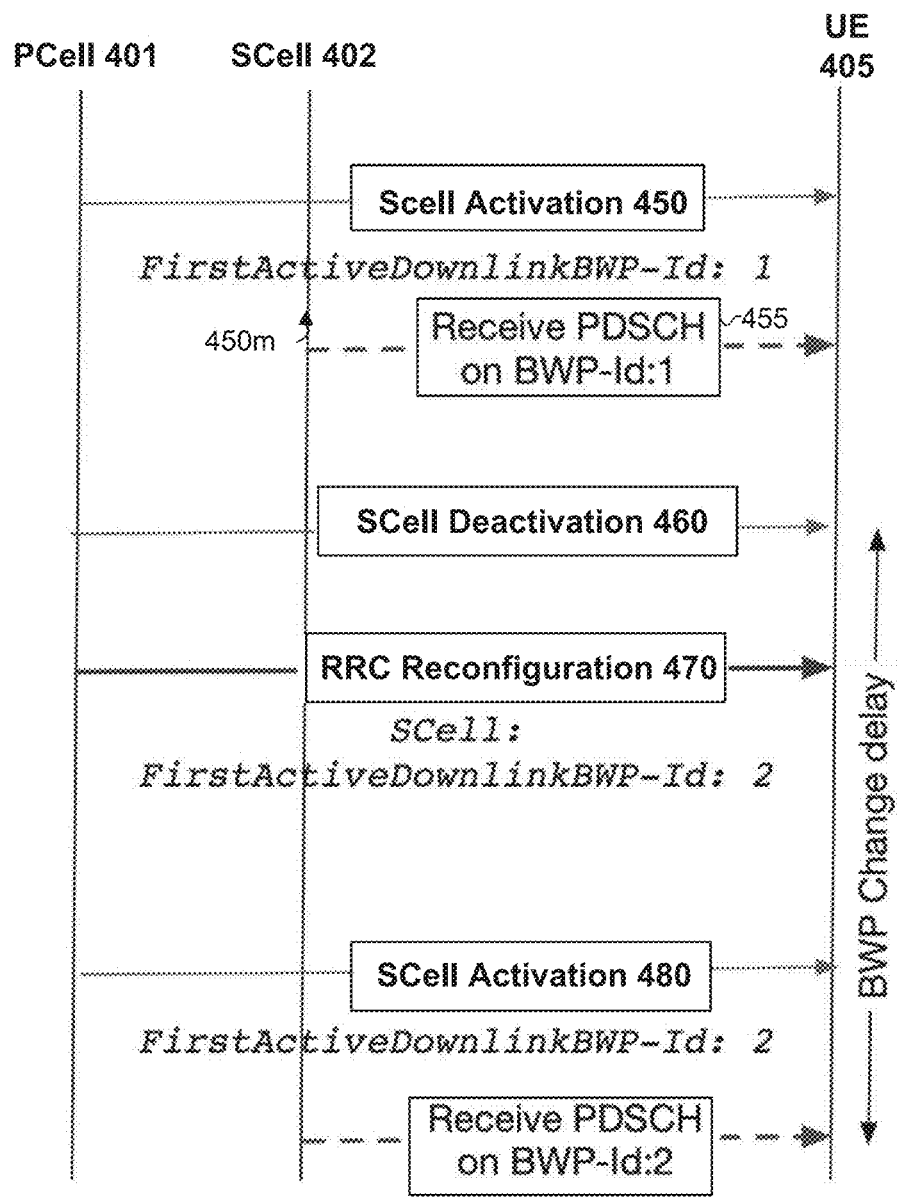

FIGS. 4A and 4B are signaling diagrams for exemplary procedure of BWP switching of an SCell. As shown, a UE is configured to activate a BWP based on SCell activation and performs BWP switching by deactivation and reactivation of the SCell.

As shown in FIG. 4A, for activation of an SCell, PCell base station 401 may send (e.g., transmit) one or more messages (e.g., one or more RRC messages) including an SCell activation message (for example, by RRC) to UE 405 for configuring a BWP of an SCell, in signal 410.

For example, the SCell activation message can include an indicator of firstActiveDownlinkBWP-ID, specifying an identifier of a first active Downlink BWP. In this example, PCell base station 401 instructs UE to set firstActiveDownlinkBWP-ID equal to 1. Although not shown, in addition or alternatively, for example, SCell activation message can include an indicator of firstActiveUpinkBWP-ID, specifying an identifier of message can configure multiple BWPs (e.g., multiple BWPs comprising a DL BWP 0, a DL BWP 1, a DL BWP 2, a DL BWP 3, an UL BWP 0, an UL BWP 1, an UL BWP 2, and an UL BWP 3 shown in a table 408). The DL (and/or UL) BWP 0 may be a default BWP. The DL (and/or UL) BWP 1 may be an initial active BWP (e.g., an initial DL BWP or an initial UL BWP). UE 405 may determine the multiple BWPs configured for the SCell, for example, based on the one or more messages 410*m*.

Upon receiving the SCell activation message, UE 405 is capable of receiving PDSCH communications from the SCell base station 402, in signal 415. In this case, UE 405 receives a PDSCH message from SCell base station 402 on a first BWP, i.e., the BWP enumerated with DL BWP 1.

The PCell base station 401 or SCell base station 402 may send a DL assignment. The DL assignment may be sent via the DL BWP 1 (e.g., an initial DL BWP). UE 405 may receive a packet via the DL BWP 1 or via another active DL BWP, for example, based on the DL assignment. UE 405 may start a BWP inactivity timer. UE 405 may start the BWP inactivity timer, for example, after receiving scheduled downlink packets.

Although not shown, additionally or alternatively, PCell base station 401 or SCell base station 402 may send an UL grant. The UL assignment may be sent via the UL BWP 1 (e.g., a first UL BWP or an initial DL BWP). UE 405 may send a packet via an UL BWP 1 (e.g., via a first UL BWP or an initial UL BWP), for example, based on the UL grant. UE 405 may start a BWP inactivity timer.

If it is determined to perform BWP switching for SCell, PCell base station 401 transmits an SCell reconfiguration message by RRC to UE 405 for reconfiguring the SCell BWP, in signal 420. For example, at signal 420 SCell reconfiguration message can include the indicator firstActiveDownlinkBWP-ID, instructing UE to set firstActiveDownlinkBWP-ID for SCell equal to 2. In this aspect, to perform SCell BWP switching, UE 405 is required to deactivate and reactivate the SCell under the new BWP-Id. For example, instead of PCell base station 401 reconfiguring the active BWP immediately, base station 401 may first send an RRC Reconfiguration Message for BWP switching (e.g., a BWP switching from the DL BWP 1 to the DL BWP 2), at signal 420 to provide an indication to UE 405 of an impending BWP switch for SCell. The RRC Reconfiguration Message can be included in a DCI Message. The SCell reconfiguration message may be sent via the active DL BWP 1.

Subsequently, to perform BWP switching for SCell, PCell Base Station 401 causes the UE to deactivate with respect to the SCell, at operation 430. In some embodiments, a base station, such as PCell Base Station 401, can transmit one or more signals to UE 405 that includes the deactivation message. In some embodiments, the deactivation message is transmitted in a MAC CE. For example, PCell Base Station 401 can send a deactivation message via MAC CE that triggers UE 405 to deactivate all BWPs, or alternatively, to use a default BWP (e.g., DL BWP 0 and/or UL BWP 0).

Then, in accordance with TS 38.331, PCell Base Station 401 sets a new first active BWP ID, activating (i.e., reactivating) SCell, at signal 440. For example, PCell Base Station 401 transmits an SCell activation message by RRC to UE 405 for reactivating the SCell BWP. For example, at signal 440 SCell reconfiguration message can include the indicator firstActiveDownlinkBWP-ID, instructing UE to set firstActiveDownlinkBWP-ID for SCell equal to 2. UE 405 may switch the DL BWP 1 to the DL BWP 2, for example, based on the RRC Reconfiguration Message, 420*m*. UE 405 may receive the RRC Reconfiguration Message, for example, by monitoring a PDCCH on the active DL BWP 1. UE 405 may switch the DL BWP 1 to the DL BWP 2, for example, based on the RRC Reconfiguration Message 420*m*.

As such, to perform SCell BWP switching, the UE is required to deactivate the SCell. In some aspects, UE 405 must await performance of some operations prior to deactivating the SCell. For example, UE 405 maintains BWP 1 for completion of a DL scheduled grant, a time according to the BWP inactivity timer, and/or other signaling delay, processing delay, etc. There may be a delay between the wireless device receiving the DCI 420*m* and the wireless device switching to the DL BWP 2. UE 405 may start and/or re-start the BWP inactivity timer, for example, after the BWP switching. The BWP inactivity timer may expire, for example, if the wireless device does not perform reception or transmission for a period of time. UE 405 may switch the DL BWP 2 to the DL BWP 0 (e.g., a default BWP). The fallback to the DL BWP 0 may occur, for example, after the BWP inactivity timer expires. There may be a delay between the BWP inactivity timer expiration and the wireless device switching to the DL BWP 0.

Alternatively, as shown in FIG. 4B, UE 405 is configured to activate a BWP for SCell and performs BWP switching by deactivation and reactivation of the SCell. In this embodiment, BWP switching occurs by deactivating and reactivating SCell without an RRC Reconfiguration Message being transmitted, e.g., at signal 420 above. In this aspect, PCell base station 401 may send (e.g., transmit) one or more messages (e.g., one or more RRC messages) including an SCell activation message (for example, by RRC) to UE 405 for configuring a BWP of an SCell, in signal 450.

For example, SCell activation message can include an indicator of firstActiveDownlinkBWP-ID, specifying an identifier of a first active Downlink BWP. In this example, PCell base station 401 instructs UE to set firstActiveDownlinkBWP-ID equal to 1. Although not shown, in addition or alternatively, for example, SCell activation message 450*m* can include an indicator of firstActiveUpinkBWP-ID, specifying an identifier of a first active Uplink BWP (i.e., firstActiveUpinkBWP-ID=1). As above, the DL (and/or UL) BWP 0 may be a default BWP and the DL (and/or UL) BWP 1 may be an initial active BWP (e.g., an initial DL BWP or an initial UL BWP). Upon receiving the SCell activation message, UE 405 is capable of receiving PDSCH communications from the SCell base station 402, in signal 455. UE 405 can receive a PDSCH message from SCell base station 402 on a first BWP, i.e., the BWP enumerated with DL BWP 1.

The PCell base station 401 or SCell base station 402 may send a DL assignment. The DL assignment may be sent via the DL BWP 1 (e.g., an initial DL BWP). UE 405 may receive a packet via the DL BWP 1 or via another active DL BWP, for example, based on the DL assignment. As above, the same is applicable to a UL assignment. UE 405 may start a BWP inactivity timer. UE 405 may start the BWP inactivity timer, for example, after receiving scheduled downlink packets.

If it is determined to perform BWP switching for SCell, PCell Base Station 401 deactivates the SCell, at operation 460. For example, PCell Base Station 401 can send a deactivation message (e.g., via MAC CE) that triggers UE 405 to deactivate all BWPs, or alternatively, to use a default BWP (e.g., DL BWP 0 and/or UL BWP 0).

As above, PCell Base Station 401 sets a new first active BWP ID, activating (i.e., reactivating) SCell, at operation 480. For example, PCell Base Station 401 transmits an SCell activation message by RRC to UE 405 for reactivating the SCell BWP. For example, at signal 420 SCell reconfiguration message can include the indicator firstActiveDownlinkBWP-ID, instructing UE to set firstActiveDownlinkBWP-ID for SCell equal to 2. UE 405 may switch the DL BWP 1 to the DL BWP 2, for example, based on the RRC configuration message, 470*m*. UE 405 may receive the RRC Reconfiguration Message, for example, by monitoring a PDCCH on the active DL BWP 1. UE 405 may switch the DL BWP 1 to the DL BWP 2, for example, based on the RRC configuration message 470*m*.

As such, to perform SCell BWP switching, the UE is required to deactivate the SCell. In some aspects, UE 405 must await performance of some operations prior to deactivating the SCell. For example, UE 405 maintains BWP 1 until time, for completion of a DL scheduled grant, a time according to the BWP inactivity timer, and/or other signaling delay, processing delay, etc. There may be a delay between the wireless device receiving the RRC configuration message 470*m* and the wireless device switching to the DL BWP 2. UE 405 may start and/or re-start the BWP inactivity timer, for example, after the BWP switching. The BWP inactivity timer may expire, for example, if the wireless device does not perform reception or transmission for a period of time. UE 405 may switch the DL BWP 2 to the DL BWP 0 (e.g., a default BWP). The fallback to the DL BWP 0 may occur, for example, after the BWP inactivity timer expires. There may be a delay between the BWP inactivity timer expiration and the wireless device switching to the DL BWP 0. BWPs are described as example resources, and any wireless resource may be applicable to one or more procedures described herein.

Figure 5:
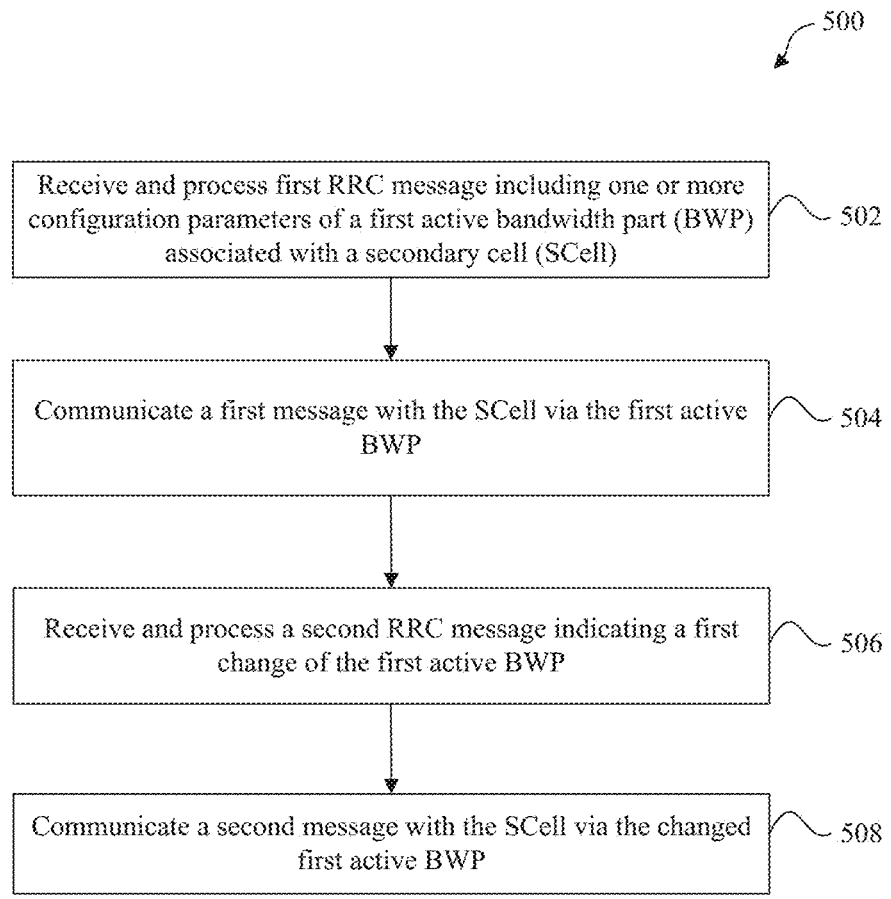
FIG. 5 illustrates an example method 500 for a system (for example, base station) supporting mechanisms for downlink (DL) and uplink (UL) BWP switching, according to some aspects of the disclosure.

FIG. 5 illustrates an example method 500 for a system (for example, base station) supporting mechanisms for downlink (DL) and uplink (UL) BWP switching for SCell, according to some aspects of the disclosure. As a convenience and not a limitation, FIG. 5 may be described with regard to elements of FIGS. 1-3, 5, and 6. Method 500 may represent the operation of an electronic device (for example, base station 101 or 102 of FIG. 1) implementing mechanisms for implementing downlink (DL) and uplink (UL) BWP switching for SCell. Method 500 may also be performed by system 600 of FIG. 6. But method 500 is not limited to the specific aspects depicted in those figures and other systems may be used to perform the method as will be understood by those skilled in the art. It is to be appreciated that not all operations may be needed, and the operations may not be performed in the same order as shown in FIG. 5.

At 502, a base station configures a UE for communicating via an SCell. In some embodiments, the UE receives from a base station a message, such as a first RRC message, including one or more configuration parameters. The parameters can include configuration information to configure multiple BWP IDs for SCell to be used for RRC-based switching. In some embodiments, the configuration parameters can include a firstActiveDownlinkBWP-Id or firstActiveUplinkBWP-Id at 502, which can be used to indicate a first active BWP upon SCell activation. For example, a SCell activation message can include an indicator of firstActiveDownlinkBWP-ID, specifying an identifier of a first active Downlink BWP. In addition or alternatively, for example, an SCell activation message can include an indicator of firstActiveUpinkBWP-ID, specifying an identifier of a first active Uplink BWP. The SCell activation message can configure one or more BWPs (e.g., multiple BWPs comprising a DL BWP 0, a DL BWP 1, a DL BWP 2, a DL BWP 3, an UL BWP 0, an UL BWP 1, an UL BWP 2, and an UL BWP 3). The DL (and/or UL) BWP 0 may be a default BWP. As shown in message 310*m*, for example, the DL (and/or UL) BWP 1 may be an initial active BWP (e.g., an initial DL BWP or an initial UL BWP).

Upon receiving the SCell activation message, the UE is capable of transmitting and receiving one or more communications with the SCell, at 504. The UE can thereby transmit and/or receive one or more communications. For example, the one or more communications can include an uplink shared channel, a downlink shared channel, a control channel, a channel state information report, a sounding reference signal, etc. For example, UE 305 is configured to receive a (PUSCH, PDSCH, etc.) message from SCell base station 302 on a first BWP, i.e., the BWP enumerated with DL BWP 1. The PCell base station 301 or SCell base station 302 can send a DL or UL assignment via a DL BWP or UL BWP, respectively. For example, UE 305 can receive a DL assignment associated with DL BWP 1, and then receive a packet via the DL BWP 1 (or other active DL BWP), based on the DL assignment. UE 305 may start a BWP inactivity timer.

At 506, if it is determined to perform BWP switching for SCell, PCell 301 transmits an SCell reconfiguration message by RRC to UE 305 for reconfiguring the SCell BWP. In some embodiments, the UE receives from a base station, such as PCell base station 301, a second RRC message, including one or more configuration parameters. The parameters can include configuration information to change an active BWP in an RRC-based BWP switching. In some embodiments, the configuration parameters can include a firstActiveDownlinkBWP-Id or firstActiveUplinkBWP-Id at 502, which can be used to indicate a first active BWP.

For example, The PCell base station 301 may send an RRC Reconfiguration Message for BWP switching (e.g., a BWP switching from the DL BWP 1 to the DL BWP 2), at operation 320 discussed with respect to FIG. 3. For example, the RRC Reconfiguration Message can be included in a DCI Message. The SCell reconfiguration message may be sent via the active DL BWP 1. The SCell reconfiguration message can include the indicator firstActiveDownlinkBWP-ID, instructing UE to set firstActiveDownlinkBWP-ID for SCell equal to 2. To perform SCell BWP switching, UE 305 may switch the DL BWP 1 to the DL BWP 2, for example, based on the RRC Reconfiguration Message. UE 305 may receive the RRC Reconfiguration Message, for example, by monitoring a PDCCH on the active DL BWP 1. UE 305 may switch the DL BWP 1 to the DL BWP 2, for example, based on the RRC Reconfiguration Message 320*m*.

For example, at 506, a base station configures and/or reconfigures the UE to perform BWP switching for SCell. UE 305 receives from PCell Base Station 301 one or more RRC Reconfiguration Message to cause the UE to perform a BWP switching operation. For example, UE 305 receives from PCell Base Station 101 an RRC Reconfiguration Message that includes an indicator of a firstActiveDownlinkBWP-Id or firstActiveUplinkBWP-Id for SCell. This is beyond a case where a base station transmits a configuration message for SCell firstActiveDownlinkBWP-Id or firstActiveUplinkBWP-Id that is valid only for SCell activation. Specifically, in method 500, a firstActiveDownlinkBWP-Id or firstActiveUplinkBWP-Id for SCell can be valid both for SCell activation and for RRC-based switch via reconfiguration. If the SCell has previously been activated, the RRC Reconfiguration Message causes the UE to reconfigure firstActiveDownlinkBWP-Id or firstActiveUplinkBWP-Id to another configured BWP-Id to perform RRC based BWP switch for the SCell. For example, referring to FIG. 2, the UE switches from DL BWP 1 to DL BWP 2, and/or switches from UL BWP 1 to UL BWP 2, and therefore configures itself to wirelessly communicate on DL BWP 2 and/or UL BWP 2. The BWP reconfiguration can include radio tuning and will be understood by those skilled in the art.

At 508, upon receiving the SCell reconfiguration message, and without deactivating the SCell, the UE is capable of transmitting and receiving one or more communications with the SCell on the changed BWP. The UE can thereby transmit and/or receive one or more communications. For example, the one or more communications can include an uplink shared channel, a downlink shared channel, a control channel, a channel state information report, a sounding reference signal, etc. For example, UE 305 is configured to receive a (PUSCH, PDSCH, etc.) message from SCell base station 302 on a changed BWP, i.e., the BWP enumerated with DL BWP 2. The PCell base station 301 or SCell base station 302 can send a DL or UL assignment via the reconfigured DL BWP or UL BWP, respectively. For example, UE 305 can maintain an active SCell (i.e., without deactivating SCell) and receive a DL assignment associated with DL BWP 2. UE 305 can then receive a packet via the DL BWP 2 (or other active DL BWP), based on the DL assignment and after having previously communicated on the SCell via DL BWP 1. According to these embodiments, a channel can be active and maintained on a new BWP without first deactivating SCell. In some embodiments, the SCell can be subsequently deactivated, for example, if the UE receives a deactivation message from PCell base station 301 via MAC CE.

Figure 6:
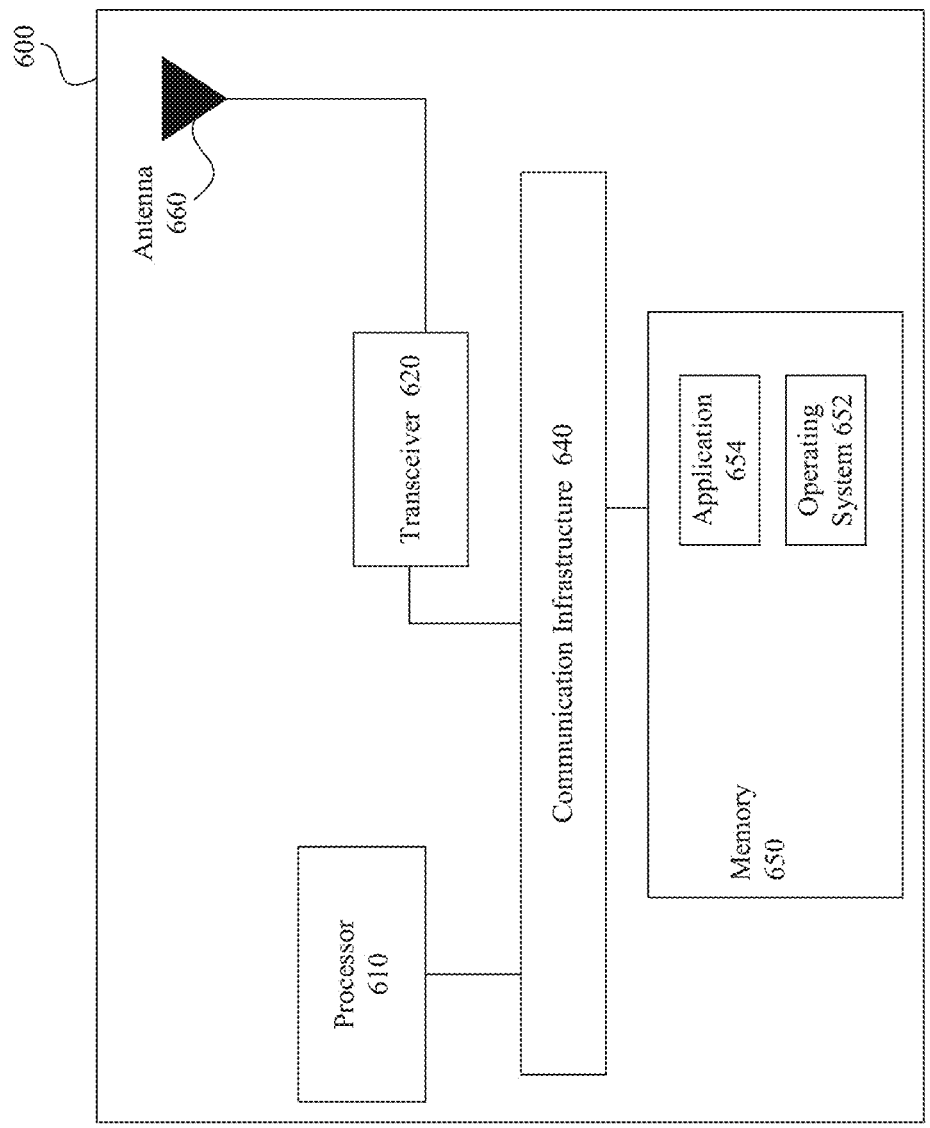
FIG. 6 illustrates a block diagram of an example system of an electronic device implementing mechanisms for downlink (DL) and uplink (UL) BWP switching, according to some aspects of the disclosure.

FIG. 6 illustrates a block diagram of an example system 600 of an electronic device implementing mechanisms for downlink (DL) and uplink (UL) BWP switching for SCell, according to some aspects of the disclosure. System 600 may be any of the electronic devices (e.g., base station 101, UE 105) of system 100. System 600 includes processor 610, one or more transceivers 620, communication infrastructure 640, memory 650, operating system 652, application 654, and one or more antenna 660. Illustrated systems are provided as exemplary parts of system 600, and system 600 can include other circuit(s) and subsystem(s). Also, although the systems of system 600 are illustrated as separate components, the aspects of this disclosure can include any combination of these, less, or more components.

Memory 650 may include random access memory (RAM) and/or cache, and may include control logic (e.g., computer software) and/or data. Memory 650 may include other storage devices or memory such as, but not limited to, a hard disk drive and/or a removable storage device/unit. According to some examples, operating system 652 can be stored in memory 650. Operating system 652 can manage transfer of data from memory 650 and/or one or more applications 654 to processor 610 and/or one or more transceivers 620. In some examples, operating system 652 maintains one or more network protocol stacks (e.g., Internet protocol stack, cellular protocol stack, and the like) that can include a number of logical layers. At corresponding layers of the protocol stack, operating system 652 includes control mechanism and data structures to perform the functions associated with that layer.

According to some examples, application 654 can be stored in memory 650. Application 654 can include applications (e.g., user applications) used by wireless system 600 and/or a user of wireless system 600. The applications in application 654 can include applications such as, but not limited to, Siri™, FaceTime™, radio streaming, video streaming, remote control, and/or other user applications.

System 600 can also include communication infrastructure 640. Communication infrastructure 640 provides communication between, for example, processor 610, one or more transceivers 620, and memory 650. In some implementations, communication infrastructure 640 may be a bus. Processor 610 together with instructions stored in memory 650 performs operations enabling system 600 of system 100 to implement mechanisms for downlink (DL) and uplink (UL) scheduling for transmission above 52.6 GHz, as described herein, including switching from a first BWP to a second BWP for an SCell.

According to some aspects, one or more transceivers 620 may be coupled to antenna 660. Antenna 660 may include one or more antennas that may be the same or different types. One or more transceivers 620 allow system 600 to communicate with other devices that may be wired and/or wireless. In some examples, one or more transceivers 620 can include processors, controllers, radios, sockets, plugs, buffers, and like circuits/devices used for connecting to and communication on networks. According to some examples, one or more transceivers 620 include one or more circuits to connect to and communicate on wired and/or wireless networks.

According to some aspects of this disclosure, one or more transceivers 620 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 620 can include more or fewer systems for communicating with other devices.

In some examples, one or more transceivers 620 can include one or more circuits (including a WLAN transceiver) to enable connection(s) and communication over WLAN networks such as, but not limited to, networks based on standards described in IEEE 802.11.

Additionally, or alternatively, one or more transceivers 620 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 620 can include a Bluetooth™ transceiver.

Additionally, one or more transceivers 620 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, the one or more transceivers 620 can be configured to operate according to a 3GPP release, such as Rel-16, Rel-17, or other present/future 3GPP standards.

According to some aspects of this disclosure, processor 610, alone or in combination with computer instructions stored within memory 650, and/or one or more transceiver 620, implements the methods and mechanisms discussed in this disclosure. For example, processor 610, alone or in combination with computer instructions stored within memory 650, and/or one or more transceiver 620, implements mechanisms for switching an active BWP for SCell, as discussed herein. For example, processor 610, alone or in combination with computer instructions stored within memory 650, and/or one or more transceiver 620, implements mechanisms for perform BWP switching for SCell, without an intervening deactivation of the SCell as discussed herein.

Figure 7:
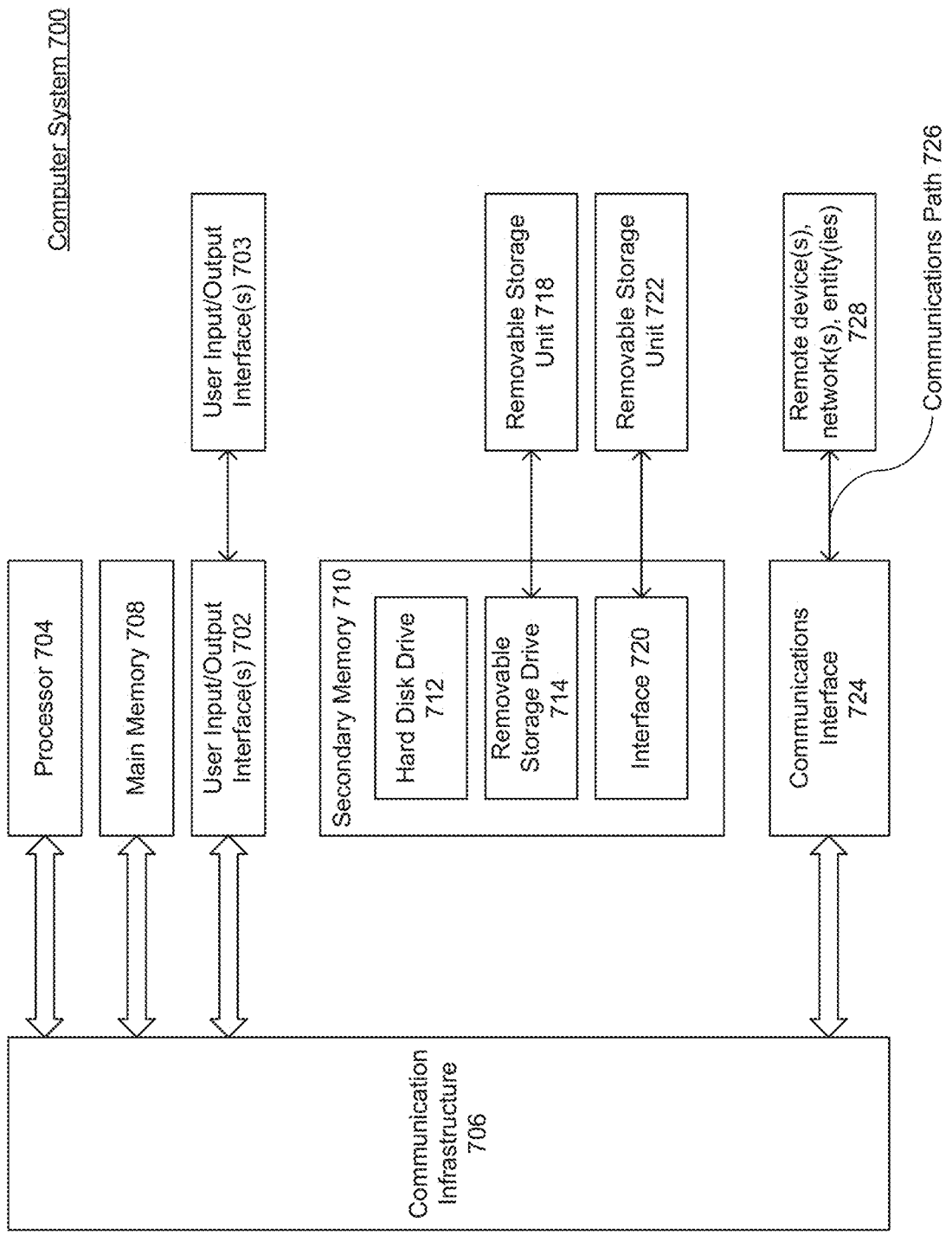
FIG. 7 depicts an example computer system useful for implementing various embodiments.

FIG. 7 depicts an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method, comprising:
   receiving, by a user equipment (UE), a first radio resource control (RRC) message comprising one or more configuration parameters for a first secondary cell (SCell) bandwidth part (BWP) that is associated with an SCell;
   communicating a first message with the SCell via the first SCell BWP;
   receiving, by the UE, a second RRC message indicating a change from the first SCell BWP to a second SCell BWP to be used for SCell communications;
   switching, by the UE based on the second RRC message, from the first SCell BWP to the second SCell BWP without deactivating the first SCell BWP; and
   communicating a second message with the SCell via the second SCell BWP.

2. The method of claim 1, further comprising:
   processing, by the UE, the first RRC message including configuring the UE to communicate with the SCell using the first SCell BWP, and
   wherein the switching comprises processing, by the UE, the second RRC message to reconfigure the UE to switch from the first SCell BWP to the second SCell BWP without deactivating the first SCell BWP and to communicate with the SCell using the second SCell BWP.

3. The method of claim 2, wherein the UE does not deactivate the SCell after processing the first RRC message and before processing the second RRC message.

4. The method of claim 1, wherein the receiving the second RRC message comprises receiving, by the UE, an SCell deactivation message via a Medium Access Control (MAC) Control Element (CE), and wherein the method further comprises processing, by the UE, the SCell deactivation message to trigger the UE to use a default BWP for the second SCell BWP.

5. The method of claim 1, wherein the first message and the second message each comprise at least one of the following:
an uplink shared channel;
a downlink shared channel;
a control channel;
a channel state information report; or
a sounding reference signal.

6. The method of claim 1, further comprising:
communicating, by the UE, with a primary cell (PCell), wherein the SCell provides secondary radio resources supplementing primary radio resources provided by the PCell, and
wherein the receiving, by the UE, the first RRC message comprises receiving the first RRC message from the PCell.

7. The method of claim 6, further comprising:
receiving, by the UE, a third RRC message comprising one or more configuration parameters of a first PCell BWP;
processing, by the UE, the third RRC message including configuring the UE to communicate with the PCell using the first PCell BWP;
receiving, by the UE, a fourth RRC message indicating a change of the first PCell BWP to a second PCell BWP; and
processing, by the UE, the fourth RRC message to reconfigure the UE to switch from the first PCell BWP to the second PCell BWP without deactivating the first PCell BWP and to communicate with the PCell using the second PCell BWP.

8. A user equipment (UE), comprising:
a transceiver configured to perform wireless communications over a wireless network; and
one or more processors, coupled to the transceiver, and configured to:
receive a first radio resource control (RRC) message including one or more configuration parameters for a first secondary cell (SCell) bandwidth part (BWP) that is associated with an SCell;
communicate, using the transceiver, a first message with the SCell via the first SCell BWP;
receive a second RRC message indicating a change from the first SCell BWP to a second SCell BWP to be used for SCell communications;
switch, based on the second RRC message, from the first SCell BWP to the second SCell BWP without deactivating the first SCell BWP; and
communicate, using the transceiver, a second message with the SCell via the second SCell BWP.

9. The UE of claim 8, wherein the one or more processors are further configured to:
process the first RRC message to configure the UE to communicate with the SCell using the first SCell BWP; and
process the second RRC message to reconfigure the UE to switch from the first SCell BWP to the second SCell BWP without deactivating the first SCell BWP and to communicate with the SCell using the second SCell BWP.

10. The UE of claim 9, wherein the one or more processors are further configured to not deactivate the SCell after processing the first RRC message and before processing the second RRC message.

11. The UE of claim 8, wherein the one or more processors are further configured to:
receive an SCell deactivation message via a Medium Access Control (MAC) Control Element (CE); and
process the deactivation message to trigger the UE to use a default BWP for the second SCell BWP.

12. The UE of claim 8, wherein the first message and the second message each comprise at least one of the following:
an uplink shared channel;
a downlink shared channel;
a control channel;
a channel state information report; or
a sounding reference signal.

13. The UE of claim 8, wherein the one or more processors are further configured to:
communicate, using the transceiver, with a primary cell (PCell), wherein the SCell provides secondary radio resources supplementing primary radio resources provided by the PCell, and
wherein the one or more processors further receive the first RRC message from the PCell.

14. The UE of claim 13, wherein the one or more processors are further configured to:
receive a third RRC message comprising one or more configuration parameters of a first PCell BWP;
process the third RRC message to configure the UE to communicate with the PCell using the first PCell BWP;
receive a fourth RRC message indicating a change of the first PCell BWP to a second PCell BWP; and
process the fourth RRC message to reconfigure the UE to switch from the first PCell BWP to the second PCell BWP without deactivating the first PCell BWP and to communicate with the PCell using the second PCell BWP.

15. A non-transitory tangible computer-readable medium having instructions stored thereon that, when executed by a processor of a user equipment (UE), cause the UE to perform operations, the operations comprising:
receiving a first radio resource control (RRC) message comprising one or more configuration parameters for a first secondary cell (SCell) bandwidth part (BWP) that is associated with an SCell;
processing the first RRC message including configuring the UE to communicate with the SCell using the first SCell BWP;
communicating a first message with the SCell via the first SCell BWP;
receiving a second RRC message indicating a change from the first SCell BWP to a second SCell BWP to be used for SCell communications;
processing the second RRC message to reconfigure the UE to switch, based on the second RRC message, from the first SCell BWP to the second SCell BWP without deactivating the first SCell BWP and to communicate with the SCell using the second SCell BWP; and
communicating a second message with the SCell via the second SCell BWP.

16. The non-transitory computer-readable medium of claim 15, wherein the receiving the second RRC message comprises receiving an SCell deactivation message via a Medium Access Control (MAC) Control Element (CE), and
wherein the processing the second RRC message comprises processing the SCell deactivation message to trigger the UE to use a default BWP for the second SCell BWP.

17. The non-transitory computer-readable medium of claim 15, wherein the first message and the second message each comprise at least one of the following:
- an uplink shared channel;
- a downlink shared channel;
- a control channel;
- a channel state information report; or
- a sounding reference signal.

18. The non-transitory computer-readable medium of claim 15, wherein the UE does not deactivate the SCell after processing the first RRC message and before processing the second RRC message.

19. The non-transitory computer-readable medium of claim 15, wherein the SCell provides secondary radio resources supplementing primary radio resources provided by a primary (PCell) that is in communication with the UE.

20. The non-transitory computer-readable medium of claim 19, wherein the operations further comprise:
- receiving a third RRC message comprising one or more configuration parameters of a first PCell BWP;
- processing the third RRC message including configuring the UE to communicate with the PCell using the first PCell BWP;
- receiving a fourth RRC message indicating a change of the first PCell BWP to a second PCell BWP; and
- processing the fourth RRC message to reconfigure the UE to switch from the first PCell BWP to the second PCell BWP without deactivating the first PCell BWP and to communicate with the PCell using the second PCell BWP.

* * * * *